(12) United States Patent
Tong et al.

(10) Patent No.: US 9,054,368 B2
(45) Date of Patent: Jun. 9, 2015

(54) CURRENT FUSE DEVICE AND BATTERY ASSEMBLY COMPRISING THE SAME

(75) Inventors: Zhiwei Tong, Guangdong (CN); Jianhua Zhu, Guangdong (CN); Weixin Zheng, Guangdong (CN); Hao Hu, Guangdong (CN)

(73) Assignee: BYD Company Limited, Shenzhen, Guangdong (CN)

( * ) Notice: Subject to any disclaimer, the term of this patent is extended or adjusted under 35 U.S.C. 154(b) by 479 days.

(21) Appl. No.: 13/301,042

(22) Filed: Nov. 21, 2011

(65) Prior Publication Data

US 2012/0126929 A1 May 24, 2012

Related U.S. Application Data

(63) Continuation of application No. PCT/CN2010/073016, filed on May 20, 2010.

(30) Foreign Application Priority Data

May 21, 2009 (CN) .......................... 2009 2 0132048
Jun. 5, 2009 (CN) .......................... 2009 2 0132457

(51) Int. Cl.
*H01H 85/00* (2006.01)
*H01H 69/02* (2006.01)
(Continued)

(52) U.S. Cl.
CPC .......... *H01M 2/206* (2013.01); *Y10T 29/49107* (2015.01); *H01H 85/36* (2013.01); *H01H 2085/025* (2013.01); *H01M 2/34* (2013.01); *H01M 2200/103* (2013.01)

(58) Field of Classification Search
CPC . H01M 2/206; H01M 2/34; H01M 2200/103; H01H 85/36; H01H 2085/025; Y10T 29/49107

USPC ......... 337/4, 5, 142, 157, 159, 187, 299, 300, 337/403, 407
See application file for complete search history.

(56) References Cited

U.S. PATENT DOCUMENTS 2,300,142 A * 10/1942 Wood ............................ 337/164
2,491,956 A * 12/1949 Curry ............................. 337/35
(Continued)

FOREIGN PATENT DOCUMENTS

CN 101373682 A 2/2009
CN 201430115 Y 3/2010
(Continued)

OTHER PUBLICATIONS

PCT International Search Report mailed Sep. 2, 2010, issued in International Application No. PCT/CN2010/073016 (6 pages).
(Continued)

*Primary Examiner* — Anatoly Vortman
(74) *Attorney, Agent, or Firm* — Finnegan, Henderson, Farabow, Garrett & Dunner, LLP (57) ABSTRACT

The present disclosure discloses a current fuse device. The current fuse device comprises: an insulating box having a cavity; a first conductor fixed to the insulating box with a first outer end and a first inner end; a second conductor fixed to the insulating box with a second outer end and a second inner end; and at least one elastic member disposed on at least one of the first conductor and the second conductor and inside the cavity. The elastic member forms an electrical connection between the first inner end of the first conductor and the second inner end of the second conductor. The elastic member has an elastic potential energy to break the electrical connection when a short circuit occurs.

7 Claims, 6 Drawing Sheets

(51) Int. Cl.
*H01M 10/42* (2006.01)
*H01M 2/20* (2006.01)
*H01H 85/36* (2006.01)
*H01M 2/34* (2006.01)
*H01H 85/02* (2006.01)

(56) References Cited

U.S. PATENT DOCUMENTS

| | | | | |
|---|---|---|---|---|
| 2,790,049 | A | * | 4/1957 | McAlister ............... 337/405 |
| 3,198,914 | A | * | 8/1965 | Baran et al. ............. 337/405 |
| 3,827,014 | A | * | 7/1974 | Wehl ..................... 337/407 |
| 4,186,366 | A | * | 1/1980 | McVey ................... 337/407 |
| 4,383,236 | A | * | 5/1983 | Urani et al. ............. 337/403 |
| 4,527,144 | A | * | 7/1985 | Arikawa ................. 337/407 |
| 5,014,036 | A | * | 5/1991 | Komoto .................. 337/407 |
| 5,612,662 | A | * | 3/1997 | Drekmeier et al. ..... 337/389 |
| 5,831,507 | A | * | 11/1998 | Kasamatsu et al. ........ 337/4 |
| 5,982,270 | A | * | 11/1999 | Wolfe et al. ............. 337/401 |
| 5,999,391 | A | * | 12/1999 | Lou et al. ................ 361/103 |
| 6,194,988 | B1 | * | 2/2001 | Yamaguchi et al. ...... 337/157 |
| 6,204,747 | B1 | * | 3/2001 | Kitchens ................. 337/407 |
| 6,348,851 | B1 | * | 2/2002 | Wyser et al. ............. 337/411 |
| 6,445,276 | B2 | * | 9/2002 | Schon et al. ............. 337/184 |
| 6,583,711 | B2 | * | 6/2003 | Yang ...................... 337/394 |
| 6,995,648 | B2 | * | 2/2006 | Jur et al. ................. 337/278 |
| 7,385,474 | B2 | * | 6/2008 | Kawanishi .............. 337/142 |
| 7,767,335 | B2 | * | 8/2010 | Sharrow et al. ......... 429/156 |
| 7,864,024 | B2 | * | 1/2011 | Schlenker et al. ....... 337/407 |
| 2007/0188147 | A1 | * | 8/2007 | Straubel et al. .......... 320/134 |
| 2011/0267168 | A1 | * | 11/2011 | Tong et al. ............... 337/187 |

FOREIGN PATENT DOCUMENTS

| | | | |
|---|---|---|---|
| CN | 201438449 U | 4/2010 | |
| DE | 2029187 A1 | 12/1971 | |
| DE | 125456 A1 | 4/1977 | |
| JP | 04169022 A * | 6/1992 | ............ H01H 37/52 |
| WO | WO 2010/133176 A1 | 11/2010 | |

OTHER PUBLICATIONS

PCT International Preliminary Report on Patentability and Written Opinion mailed Nov. 22, 2011, issued in International Application No. PCT/CN2010/073016 (6 pages).

\* cited by examiner

Fig. 12

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

According to the present disclosure, a current fuse device may be provided. The current fuse device may comprise an insulating box having a cavity, a first conductor, a second conductor, and at least one elastic member. The first conductor may be fixed by the insulating box with a first outer end projecting out of the insulating box and a first inner end in the cavity. The second conductor may be fixed by the insulating box with a second outer end projecting out of the insulating box and a second inner end provided in the cavity which may be opposed to the first inner end of the first conductor. The at least one elastic member may be provided on at least one of the first conductor and the second conductor inside the cavity forming electrical connections with the first and second inner ends simultaneously. The elastic member may have an elastic potential energy to break the electrical connection when a short circuit occurs.

It should be noted that the first or second conductor of the current fuse device may be connected to a battery respectively. Alternatively, one of the first or second conductor may be connected to the battery, and the other one may be connected to other devices for electrical conduction.

Further, it should be noted that the terminology of "short circuit" may mean an instantaneous extreme large current occurred in the electric system or large current lasting for a time, which may bring detrimental damages. And the meaning stated hereinabove and any equivalents thereof are within the scope of the present disclosure.

For short circuit protection, a current fuse device may have a responsive time, which decreases while the current increasing. When the short-circuit current is relatively low, the breaking time may be tens of seconds. During this process, the temperature is raised with the accumulation of heat. When the temperature reaches the melting point of the fuse device, the fuse device breaks. As for instantaneous extreme large current, such as ten times of the rated current, the melting time is on the order of milliseconds, because the heat from the welding spots can not be dissipated timely which renders the melting of the current fuse device substantially immediately.

In some embodiments, the electrical connection may be formed by welding, and an arc-extinguishing medium may be filled into the cavity.

The embodiments of the present disclosure will be described in detail in combination with accompanying figures.

First Embodiment

As shown in FIGS. 3-6, a current fuse device 100 may comprise an insulating box 1 having a cavity 10, a first conductor 21, a second conductor 22, a first conductive spring plate 31, and a second conductive spring plate 32. The first conductor 21 and the second conductor 22 may be fixed to the insulating box 1. The first conductor 21 may have a first outer end 212 projecting out of the insulating box 1 and a first inner end 211 in the cavity 10. And the second conductor 22 may have a second outer end 222 projecting out of the insulating box 1 and a second inner end 221 in the cavity 10.

The first and second conductive spring plates 31, 32 may be placed in the cavity 10. An end of the first conductive spring plate 31 may be fixed and electrically connected to the first inner end 211. An end of the second conductive spring plate 32 may be fixed and electrically connected to the second inner end 221. The other ends of the first and second conductive spring plates 31 and 32 may be connected together by pre-press welding by forming welding spots. And at least one of the first conductive spring plate 31 and the second conductive spring plate 32 may have an elastic potential energy for breaking away from the welding spots when a short circuit occurs.

The welding may be performed with forces applying on the first and second conductive spring plates 31 and 32 respectively to overcome elastic forces thereof so that the first and second conductive spring plates 31 and 32 may be welded together. According to an embodiment of the disclosure, the welding may be soldering.

Referring again to FIGS. 3-6, herein, the insulating box 1 may comprise a main body 12, an upper cover 11, and a lower cover 13. The upper cover 11 and lower cover 13 may be fixed on the main body 12 and enclosed together with the main body 12 to form the cavity 10. And the first and second conductors 21 and 22 may project out of the upper cover 11 and the main body 12 and may be clamped thereby accordingly.

The upper cover 11 may be formed into a half-enclosure including an upper surface 111 and two sides 112 and 113 extending downwardly from edges of the upper surface 111. The main body 12 may be covered by the upper surface 111. The first conductor 21 and the second conductor 22 may be clamped by both sides 112 and 113 and the main body 12. The main body 12 may be of a hollow structure having two grooves on both sides thereof for fixing the first and second conductors 21 and 22. Threaded holes are disposed on the main body 12, the upper cover 11, and the lower cover 13 for connecting the main body 12, the upper cover 11, and the lower cover 13 and fixing the first and second conductors 21 and 22 on the main body 12, accordingly.

The insulating box 1 may be made from materials with high temperature resistance or corrosion resistance, for example, ceramics, asbestos, or polytetrafluoroethylene, etc. Because of the insulating box 1, the first and second conductors 21 and 22 may be fixed and shielded accordingly. And the connection and disconnection of the current fuse device 100 may be more reliable.

Due to the independent design of the current fuse device, the rigidity of the insulating box 1 may overcome the installing stress existed between the batteries, preventing ineffective fusing caused by accidental events such as displacements of tabs due to high temperature softening etc.

According to an embodiment of the disclosure, the first conductor 21 and the first conductive spring plate 31 may be integrally formed. And the second conductor 22 and the second conductive spring plate 32 may be integrally formed. The materials of the integrally formed structures may be same or different from each other.

Figure 6:
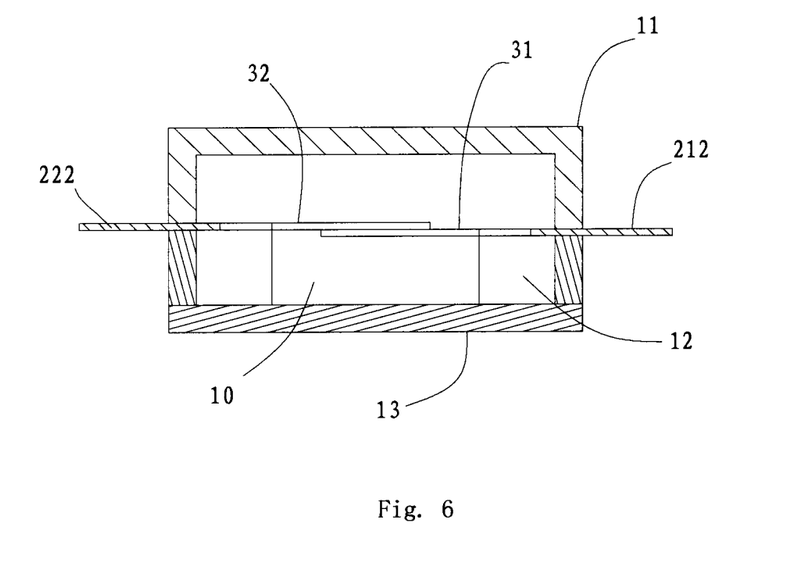
Figure 7:
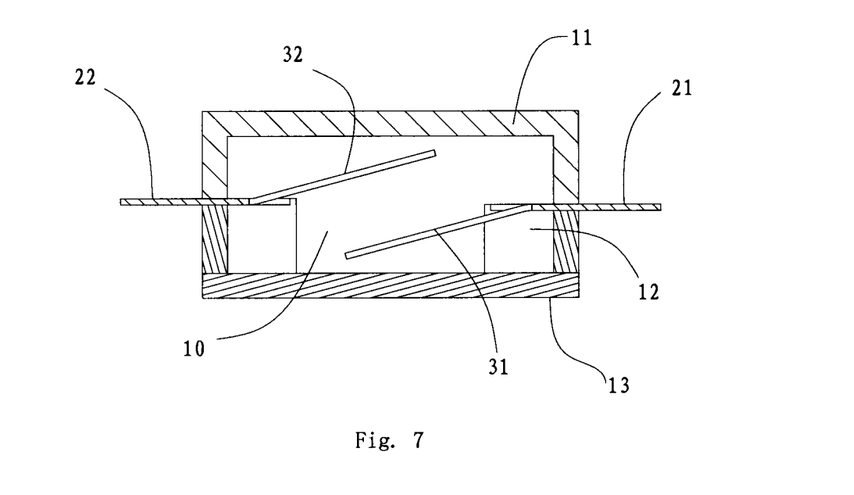
Figure 8:
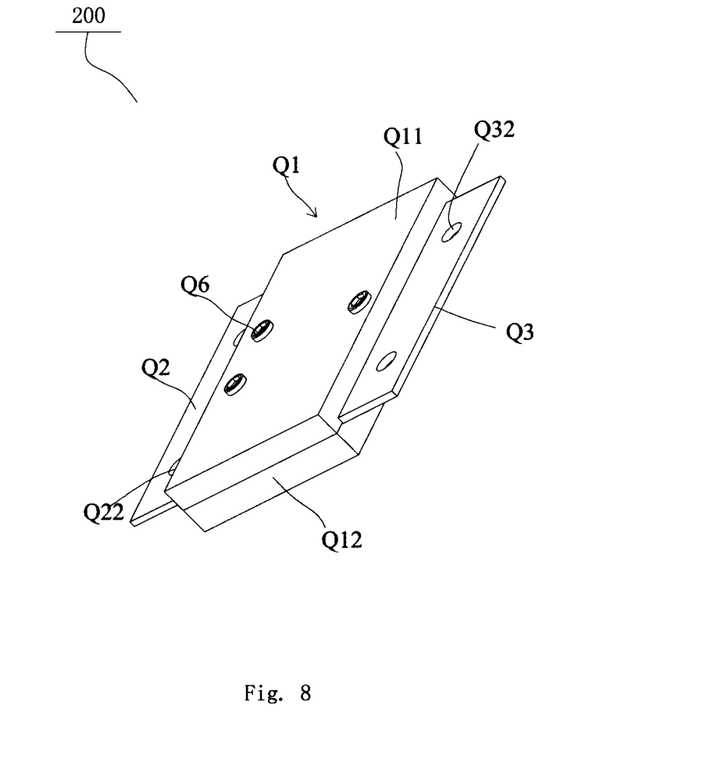

Referring to FIG. 7, under natural state without external force being applied, the first conductive spring plate 31 may be bended downwardly. The second conductive spring plate 32 may be bended upwardly and may be substantially parallel to the first conductive spring plate 31. During welding, the first and second conductive spring plates 31 and 32 may be pressed together on the planes of the first and second conductors 21 and 22, respectively. The first and second conductive spring plates 31 and 32 after welding are is shown in FIG. 6.

More particularly, both of the conductive spring plates 31 and 32 may be bended. However, according to an embodiment of the disclosure, the conductive spring plate 31 or the conductive spring plate 32 may be bended to possess the elastic potential energy which may also break away from the electrical connection when a short circuit occurs. According to another embodiment of the disclosure, the conductive spring plates 31 and 32 with flat shape, which are not positioned in the same plane, may be pressed and welded together so that the conductive spring plates 31 and 32 may possess elastic potential energy to ensure breaking of the electrical connection when a short circuit occurs.

Figure 4:
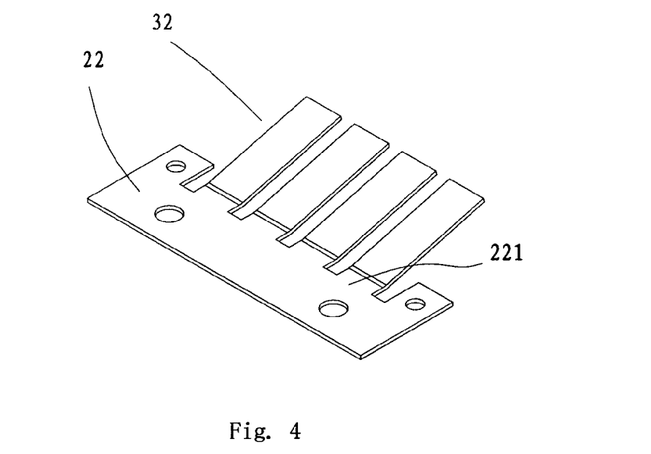
Figure 5:
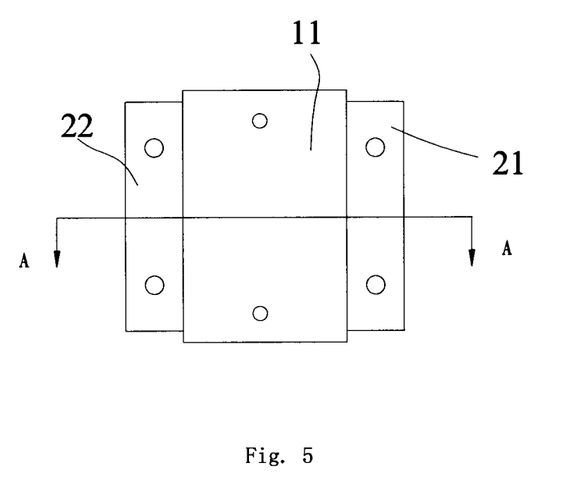

The conductive spring plates 31 and 32 may be of laminated structure. Particularly, each of the first and the second conductive spring plates 31 and 32 may comprise at least two branch spring plates, and may have a comb-shaped structure as shown in FIG. 4. Although FIG. 4 shows only the second conductive spring plate 32, the first conductive spring plate 31 has a substantially similar structure that matches the second conductive spring plate 32.

The conductive spring plate may be made from elastic conductive materials such as beryllium bronze and phosphor bronze, or composite materials such as composite plates of elastic copper materials with pure copper/aluminum. Particularly, the conductive spring plates 31 and 32 may be made from beryllium copper alloy, because of its excellent heat conductivity, electrical conductivity and elasticity, and excellent creep resistance.

When the connection between the conductive spring plates 31 and 32 is broken, the instantaneous voltage between them may be very high and may cause a strong electrical arc discharge. When the short circuit occurs, the amount of the flammable gas generated is larger than that generated under common conditions. As a result, the high temperature generated by the arc discharge may be enough to ignite the flammable gas, thus causing hidden safety problems. More particularly, an arc-extinguishing medium (not shown) which can prevent the electrical arc accident and protect the batteries may be filled into the cavity 10.

Particularly, the arc-extinguishing medium may be quartz sand which may be electronegative and has better heat conductivity and insulation performance. The branch structure of the conductive spring plates 31 and 32, on one hand, can increase the resistance between the spring plates resulted from the reduced conductive area of the spring plates. Under a large current, local temperature may rise rapidly and, thus, result in instantaneous melting and disconnection of the welding spots, reducing a response time of open circuit protection.

On the other hand, the branch structure may reduce the resistance between the spring plates and the quartz sand resulted from smaller resistant area of the spring plates. And when the connection between the conductive spring plates 31 and 32 are broken, the quartz sand subjected to the pressure from the branch spring plates may easily flow into the gap between the adjacent branch spring plates and fill between the opposed conductive spring plates 31 and 32. The quartz sand dispersed between the spring plates may help to prevent the formation of the electrical arc discharging.

Particularly, the first and second conductors 21 and 22 may be of laminated structures and may be thicker than the conductive spring plates 31 and 32. Because of the reduced conductive area of the conductive spring plates 31 and 32, the thinner conductive spring plates may have larger resistance than the thicker conductors. Because of the increased conductive area of the current fuse device, the current fuse device 100 may have lower resistance. When the current is lower, the heating power is lower.

Although the resistances of the spring plates are larger, due to the excellent heat conductivity of the spring plates, there is enough time to carry out the heat conduction and heat radiation on the space in the cavity or quartz sand, thus making the heat disperse promptly. Therefore, the temperature of the spring plates may be substantially the same as that of the current fuse device 100, so that it can be ensured that the current fuse device 100 can work properly and have a high efficient electrical connection under the common current conditions.

When a short circuit occurs, due to the much larger current and larger resistance of the spring plates, a large amount of heat may be generated instantaneously. The heat may not be dissipated promptly. Because the heat capacity of the spring plates are very low, the melting temperature of the welding spots may be reached in a very short time. When the welding spots is melted, the spring plates 31 and 32 may overcome the surface liquid tension and the external resistance under the elastic stress and break from each other with a strong reliability and short response time. Particularly, the resistance ratio between the conductive spring plates 31 and 32 and the conductors 21, 22 may range from about 1.5 to about 2.5.

The current fuse device 100 may be of an independent structure, which increases the maneuverability of the production and maintenance.

The current fuse device 100 according to an embodiment of the disclosure may be provided as following:

Each of conductors 21 and 22 may be made from a beryllium copper alloy having a conductive sectional size of about 40 mm×2 mm, and each of the conductive spring plates 31 and 32 may comprise four branched spring plates having a conductive sectional size of about 4 mm×0.5 mm. The distance between the branched spring plates may be about 2 mm.

The total resistance of the current fuse device 100 may be about 0.1 to 0.2 milliohm. The resistance of the conductive spring plates (part) may be about 0.05 to 0.1 milliohm. And the resistances may be adjusted by changing the size and thickness of the conductors 21 and 22 or conductive spring plates 31 and 32. Under the condition of an overloading current of 350 A, the current fuse device 100 may at least provide a safe time of about 15 minutes. And under the condition of an overloading current of 1000 A, the breaking time of the current fuse device may be about 16 seconds. When two batteries are used for testing, the average current is about 1,023 A in the early 20 seconds when a short circuit occurs. Thus, the response time of the current fuse device 100 meets the requirements of short-circuiting protection for a battery assembly as will be described hereinafter.

As described above, the current fuse device 100 provides a high reliability for breaking the circuit and extinguishing electrical arc when a short circuit occurs. In addition, the current fuse device 100 provides a short response time for short-circuit protection. Further, the manufacturing and maintenance costs of the current fuse device 100 are low, because the device can be disassembled and assembled rapidly.

Figure 3:
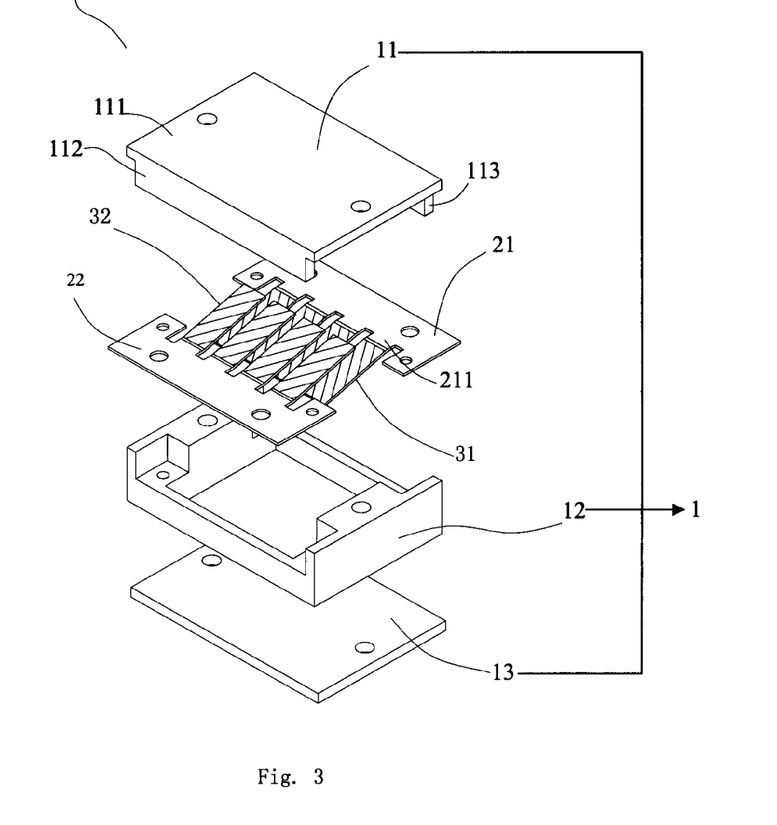

In particular, the current fuse device 100 may be manufactured by following steps:

1) fixing the conductive spring plates 31 and 32 onto the main body 12 using screws as shown in FIGS. 3 and 7;

2) fixing the main body 12 on an aluminum welding support mated with the main body 12, and pressing the conductive spring plates 31 and, 32 flat into the shape as shown in FIG. 6. The aluminum may not be welded together with tin;

3) coating a solder paste uniformly into the gap between the conductive spring plates 31 and 32;

4) compacting and welding the conductive spring plates 31 and 32 together; and 5) removing the aluminum support, installing the upper and lower covers 11 and 13, and filling quartz sand into the cavity 10.

Second Embodiment

In the following, a second embodiment of the current fuse device 200 will be described with reference to FIGS. 8-12. Specifically, the current fuse device 200 comprises an insulating box Q1 having a cavity, a first conductor Q2, a second conductor Q3, and a conductive spring plate Q5. The first conductor Q2 may have a first outer end Q201 projecting out of the insulating box Q1 and a first inner end Q202 in the cavity. The second conductor Q3 may have a second outer end Q301 projecting out of the insulating box Q1 and a second inner end Q302 in the cavity. In addition, there is a gap Q4 between the first conductor Q2 and the second conductor Q3.

A first end of the conductive spring plate Q5 may be fixed, and a second end of the conductive spring plate Q5 may be pre-pressed to extend into the gap Q4 and welded together with the first inner end of the conductor 21 and the second inner end of the conductor 22. The conductive spring plate Q5 may have an elastic potential energy for breaking away from the welding spots when a short circuit occurs. Because the short-circuit current is very large, and because the heat capacity at the welding spots is very small, the heat generated cannot be dissipated rapidly, thereby melting the welding spots in a short time or substantially instantaneously. When the welding spot are melted, the conductive spring plate Q5 may restore to its original shape under the elastic potential energy contained therein to overcome the surface tension and external resistant force, providing a high fusing reliability.

The component of the current fuse device 200 will be further described in details in combination with the accompanying figures.

Referring to FIGS. 9-12, the insulating box Q1 may comprise an upper box Q11 and a lower box Q12. The cavity therein may be formed by enclosing the upper box Q11 and the lower box Q12 and spaced by the conductors Q2 and Q3 and the conductive spring plate Q5 welded together to form two sealing cavities: an upper cavity Q13 and a lower cavity Q14. The conductors Q2 and Q3 have grooves Q111 and Q121, respectively, to provide the inner space for the cavities Q13 and Q14 respectively. The conductors Q2 and Q3 and the conductive spring plate Q5 welded together may be placed between the grooves Q111 and Q121 to achieve the sealing of the upper cavity Q13 and the lower cavity Q14.

Figure 9:
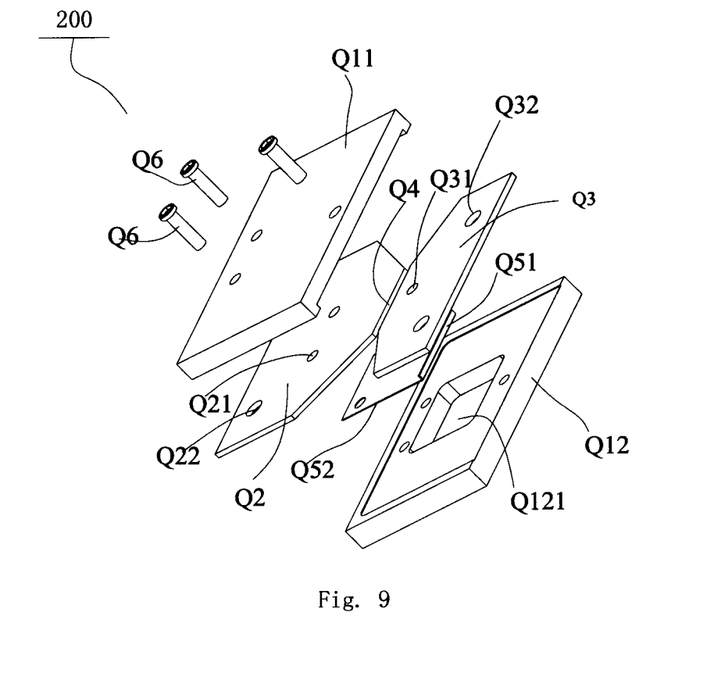
Figure 10:
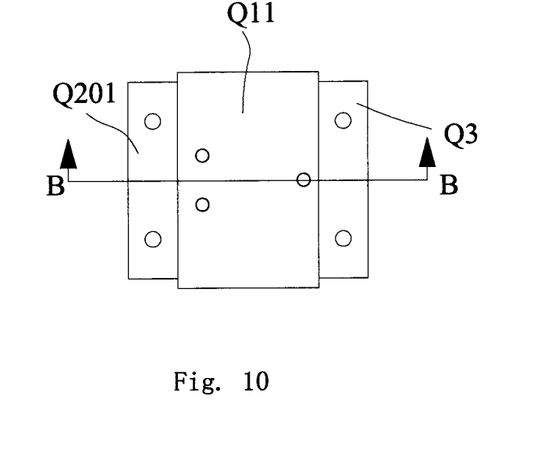
Figure 11:
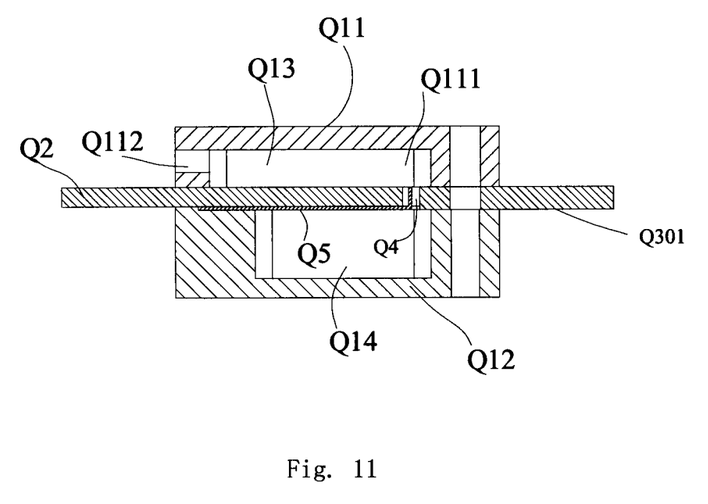

The conductive spring plate Q5 may be on one side of the second groove Q121 and may be narrower than the second groove Q121. The height of the lower cavity Q14 may be greater than the height of the upper cavity Q13, so that the conductive spring plate Q5 can be effectively bounced off when a short circuit occurs and does not interfere with the lower cavity Q14. The upper cover Q11, the conductors Q2 and Q3, the conductive spring plate Q5, and the lower cavity Q14 may have a plurality of screw holes formed thereon and may be tightened by screws Q6 as shown in FIG. 9. The first end of the conductive spring plate Q5 may be clamped between the first conductor Q2 and the lower box Q12 for positioning.

The insulating box Q1 can be made from high temperature resistance or corrosion resistance materials. Particularly, the materials may be ceramics, asbestos, or polytetrafluoroethylene. Because of the insulating box Q1, the conductors Q2 and Q3 may be fixed and shielded accordingly. And the connection and disconnection of the current fuse device 200 may be more reliable.

Particularly, to extinguish electrical arc when a short circuit occurs, an arc-extinguishing medium quartz sand (not shown) may be filled into the upper cavity Q13. Thus, when the welding spots is melted and the connection is broken by conductive spring plate Q5, the quartz sand under gravity may flow from the upper cavity Q13 into the lower cavity Q14 via the gap Q4, thus effectively eliminating the adverse effect caused by arc discharge and enhancing disconnection stability. The arc-extinguishing medium may be any materials with proper characteristics. According to the present embodiment, a screw hole Q112 penetrating through the upper cavity Q13 may be disposed on a side wall of the upper box Q11. The quartz sand may be filled into the upper cavity Q13 via the screw hole Q112. After the quartz sand is filled in, the screw hole Q112 may be sealed by a screw (not shown).

Particularly, the conductive spring plate Q5 may be made from a copper-plated spring steel plate with proper elasticity and electrical conductivity. In the embodiment as shown in FIG. 9, a cross section of the conductive spring plate Q5 may be of a "L" shape and includes a long side Q52 and a short side Q51. The second end of the conductive spring plate Q5 may be the short side Q51 which may be pre-pressed to be extended into the gap Q4 and welded together with the first inner end and the second inner end of the conductors Q2 and Q3. Under natural conditions, the long side Q52 may be bended toward the outer side of the conductive spring plate Q5. When the short side Q51 is welded into the gap Q4, an elastic potential energy making the conductive spring plate Q5 move towards the lower cavity Q14 may be stored in the long side Q52. When a short circuit occurs, the welding spots may be melted, the elastic potential energy may be released, and the short side Q51 may be broken away from the gap Q4 to achieve a reliable disconnection.

Figure 12:
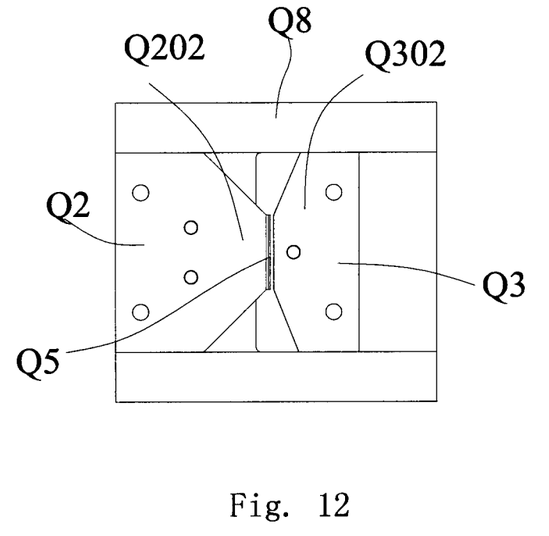
FIG. 12 is a schematic view in which first and second conductors and a conductive spring plate shown in FIG. 11 are welded together.

Particularly, the conductors Q2 and Q3 may be made from copper plates. Screw holes Q21 and Q31 may be formed on the conductors Q2 and Q3, respectively, for the screws Q6. Mounting holes Q22 and Q32 may be formed on the outer ends of the conductors Q2 and Q3, respectively, for connecting the current fuse device 200 with individual batteries. The inner end Q202 of the conductor Q2 and the inner end 302 of the conductor Q3 may be formed into trapezoid shapes. The shorter sides of the trapezoid shapes of the connectors Q2 and Q3 are positioned in parallel with each other as shown in FIG. 12. The trapezoidal shapes may properly increase the resistance between the first conductor Q2 and the second conductor Q3, as well as increase the temperature of the welding spots, when the short circuit occurs, to accelerate the melting of the welding spots.

The current fuse device 200 according to the embodiment may be rapidly fused when the short circuit occurs. The current fuse device 200 may minimize the damage to the batteries associated with the short circuit. Further, production and maintenance thereof may be facilitated due too the design as described above. The current fuse device 200 also provides sufficient capacities for carrying over-current (i.e., a large current) in normal operation modes, thus possessing a certain overloading capacity.

Because there is enough time for heat generated at the welding spots of the current fuse device to be transmitted through the conductors Q2 and Q3 to individual batteries and a heat controlling system, and because a part of the heat is absorbed by the arc-extinguishing medium, such as the quartz sand etc., the temperature of the welding spots may be substantially the same as that of the conductors Q2 and Q3. As a result, the welding spots and the conductors Q2 and Q3 may be deemed as an integral part with low resistance and enhanced over-current capacity.

Because the current caused by a short circuit is much larger than currents under normal operation modes, the amount of heat generated at the welding spots may be substantially increased and often by about 10 times. Because a large amount of heat cannot be dissipated instantaneously, and because the mass of the welding spots are much lower than that of the conductors Q2 and Q3 and the quartz sand, the heat capacity of the spring plates are very low. As a result, the temperature of the welding spots may be increased rapidly to reach the melting point of the welding spots. Thus, the welding spots may be melted, and the spring plates Q5 may spring back into the upper cavity 13.

The current fuse device may be an independent structure, which may increase the maneuverability in the production and maintenance.

The current fuse device 200 according to an embodiment of the present disclosure thereof may be provided as following:

The conductors Q2 and Q3 may be made from T2 copper plates having a conductive sectional size of about 1.7 mm×40 mm and 2 mm×40 mm, respectively. The size of the gap Q4 between the conductors Q2 and Q3 may be about 1.5 mm. The conductive spring plate Q5 may have a conductive sectional size of about 15 mm×1.7 mm with a thickness of about 0.4 mm.

The resistance of the current fuse device 200 may be about 0.1 to 0.13 milliohm. The resistance of the welding joint may be about 0.04 to 0.05 milliohm. The resistances may be adjusted by changing the size and thickness of the conductors Q2 and Q3 or conductive spring plate Q5.

According to one embodiment, when an overloading current of 350 A is loaded in the current fuse device 200, the current fuse device 200 can provide about at least 15 minutes of operation time. When an overloading current of 1000 A is loaded in the current fuse device 200, the current fuse device 200 may break in about 18 to 20 seconds. When a short circuit occurs in a two-battery system, the average current in the current fuse device 200 is about 1,023 A in the first 20 seconds. Thus, the response time of the current fuse device 200 meets the requirements of short circuit protection.

Referring to FIGS. 9 and 12, the current fuse device 200 may be produced by the following steps:

1) clamping the conductors Q2 and Q3 and the conductive spring plate Q5, which is pre-pressed and elastically deformed, on a fixture Q8 according to FIG. 12, and pressing the long side Q52 of the conductive spring plate Q5 against the conductor Q2 with the short side Q51 extending into the gap Q4 between the conductors Q2 and Q3;

2) coating a solder paste into the gap Q4 uniformly and covering the short side Q51 with the solder paste, then completing the welding by a welding equipment, integrating the conductors Q2 and Q3 with the conductive spring plate Q5 accordingly; and 3) welding the conductors Q2 and Q3 and the conductive spring plate Q5 between the upper box Q11 and lower box Q12, tightening them via screws Q6, filling quartz sand into the upper cavity 13 via a screw hole Q112 on the side of the upper box Q11, and sealing the screw hole Q112 with a screw.

The current fuse device may be produced separately from the batteries and manufactured in batch, thus the production efficiency may be enhanced and the cost may be lowered with consistent product quality. Further, manufacturing and maintenance of the current fuse device 200 may be improved accordingly.

Figure 1:
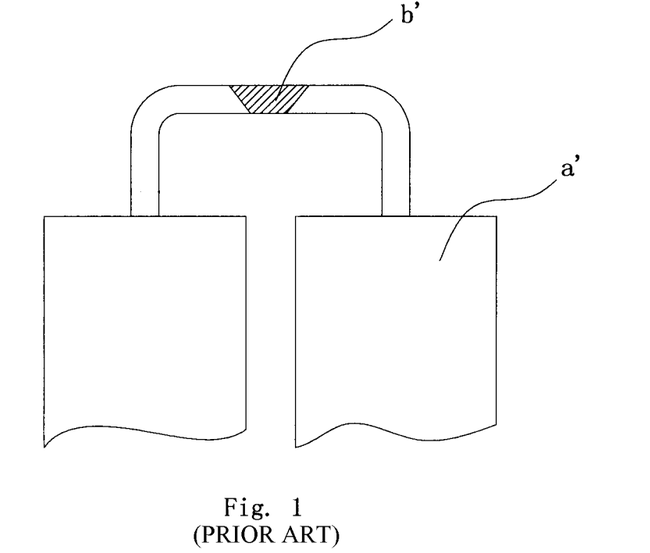
Figure 2:
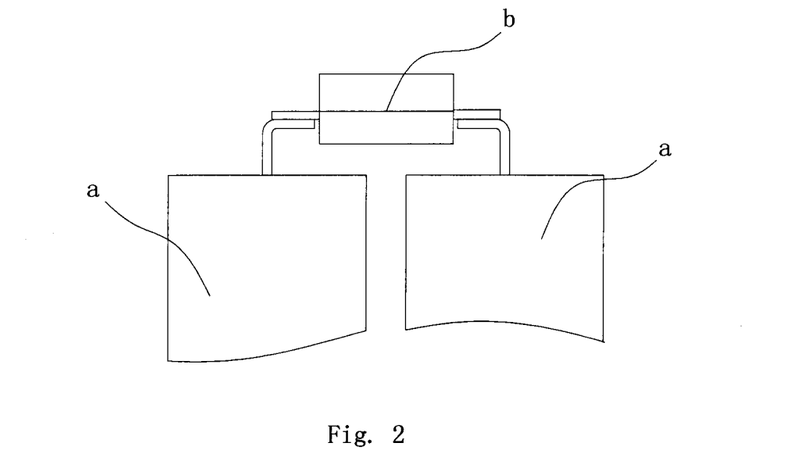

As shown in FIG. 2, a battery assembly may be provided which comprises a plurality of individual batteries. At least two of the individual batteries are electrically connected via the current fuse device as described above.

Although explanatory embodiments have been shown and described, it would be appreciated by those skilled in the art that changes, alternatives, and modifications all falling into the scope of the claims and their equivalents can be made in the embodiments without departing from spirit and principles of the disclosure.

What is claimed is:

1. A current fuse device comprising:
an insulating box having a cavity;
a first conductor fixed to the insulating box with a first outer end projecting out of the insulating box and a first inner end in the cavity;
a second conductor fixed to the insulating box with a second outer end projecting out of the insulating box and a second inner end in the cavity, the second inner end of the second conductor opposing the first inner end of the first conductor; and
at least one elastic member disposed on at least one of the first conductor and the second conductor and inside the cavity, the elastic member forming an electrical connection between the first inner end of the first conductor and the second inner end of the second conductor,
wherein the elastic member has an elastic potential energy to break the electrical connection when a short circuit occurs,
wherein a gap is formed between the first inner end of the first conductor and the second inner end of the second conductor, the elastic member has a first end being fixed to one of the first conductor and the second conductor and a second end being provided in the gap, and
wherein the first inner end of the first conductor and the second inner end of the second conductor are formed into trapezoid shapes, the first conductor and the second conductor being disposed with short sides of the trapezoid shapes in parallel and opposing each other.

2. The current fuse device according to claim 1, wherein the elastic member is a conductive spring plate having a cross section of a "L" shape including a long side and a short side, and the second end of the conductive spring plate comprises the short side.

3. The current fuse device according to claim 1, wherein the insulating box comprises:
an upper box; and
a bottom box which is connected with the upper box to form the cavity.

4. The current fuse device according to claim 1, wherein the electrical connection is formed by welding.

5. The current fuse device according to claim 1, wherein the cavity is filled with at least one arc-extinguishing medium.

6. A battery assembly comprising:
a plurality of batteries, at least two of the batteries being electrically connected with each other via a current fuse device, wherein the current fuse device comprising:
an insulating box having a cavity;
a first conductor fixed to the insulating box with a first outer end projecting out of the insulating box and a first inner end in the cavity;
a second conductor fixed to the insulating box with a second outer end projecting out of the insulating box and a second inner end in the cavity, is the second inner end of the second conductor opposing the first inner end of the first conductor; and at least one elastic member disposed on at least one of the first conductor and the second conductor and inside the cavity, the elastic member forming an electrical connection between the first inner end of the first conductor and the second inner end of the second conductor, wherein the elastic member has an elastic potential energy to break the electrical connection when a short circuit occurs, wherein a gap is formed between the first inner end of the first conductor and the second inner end of the second conductor, the elastic member has a first end being fixed to one of the first conductor and the second conductor and a second end being provided in the gap, and wherein the first inner end of the first conductor and the second inner end of the second conductor are formed into trapezoid shapes, the first conductor and the second conductor being disposed with short sides of the trapezoid shapes in parallel and opposing each other.

7. A method of making a current fuse device, comprising:

forming an insulating box have a cavity;

fixing a first conductor to an insulating box with a first outer end of the first conductor projecting out of the insulating box and a first inner end of the first conductor in the cavity;

fixing a second conductor to the insulating box with a second outer end of the second conductor projecting out of the insulating box and a second inner end of the second conductor in the cavity, the second inner end of the second conductor opposing the first inner end of the first conductor;

disposing at least one elastic member on at least one of the first conductor and the second conductor and inside the cavity, the elastic member forming an electrical connection between the first inner end of the first conductor and the second inner end of the second conductor, wherein the elastic member has an elastic potential energy to break the electrical connection when a short circuit occurs, wherein a gap is formed between the first inner end of the first conductor and the second inner end of the second conductor, the elastic member has a first end being fixed to one of the first conductor and the second conductor and a second end being provided in the gap, and wherein the first inner end of the first conductor and the second inner end of the second conductor are formed into trapezoid shapes, the first conductor and the second conductor being disposed with short sides of the trapezoid shapes in parallel and opposing each other.

* * * * *

UNITED STATES PATENT AND TRADEMARK OFFICE
CERTIFICATE OF CORRECTION

PATENT NO.       : 9,054,368 B2
APPLICATION NO.  : 13/301042
DATED            : June 9, 2015
INVENTOR(S)      : Zhiwei Tong et al.

Page 1 of 1

It is certified that error appears in the above-identified patent and that said Letters Patent is hereby corrected as shown below:

In the Claims:

Claim 7, col. 11, line 21, "forming an insulating box have a cavity;" should read --forming an insulating box having a cavity--.

Signed and Sealed this
Ninth Day of August, 2016

Michelle K. Lee
*Director of the United States Patent and Trademark Office*